Figure 1:
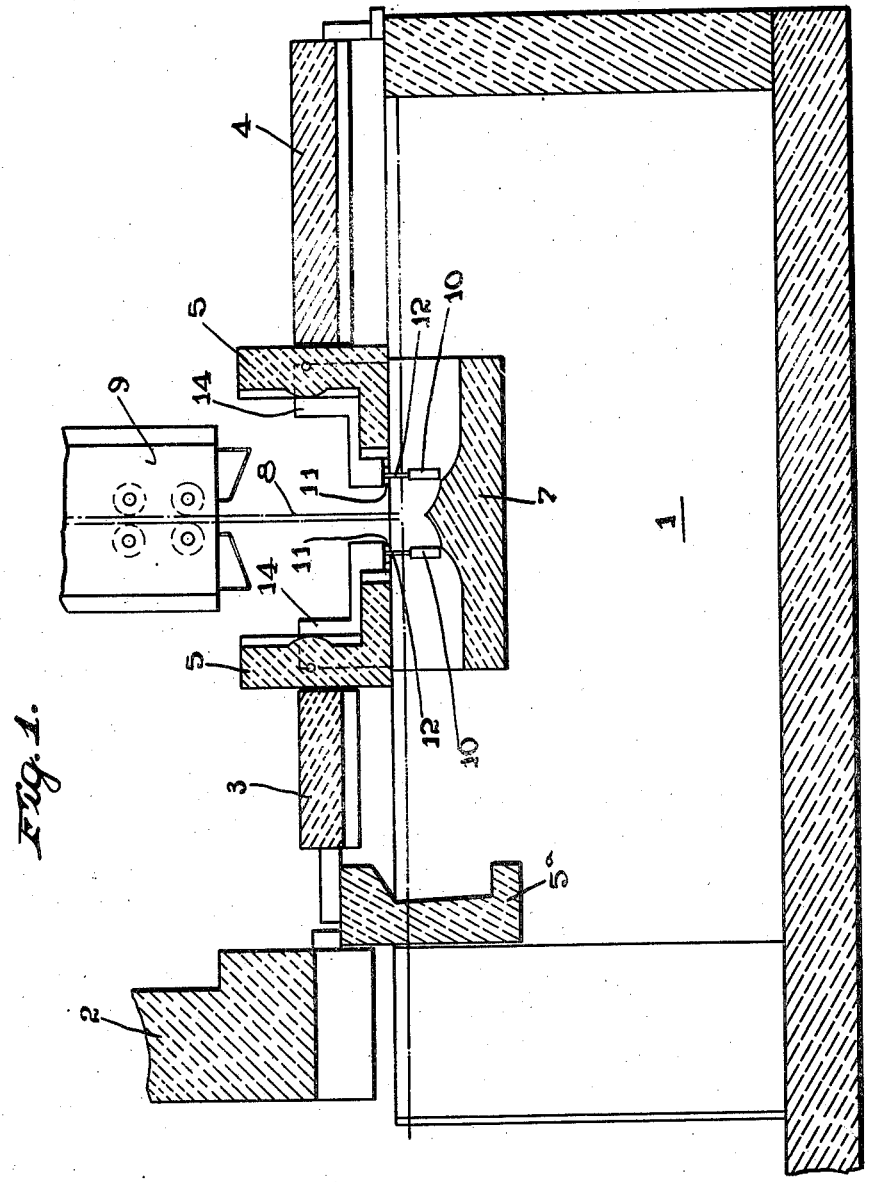

April 19, 1938.  W. G. KOUPAL ET AL  2,114,715
APPARATUS FOR MAKING SHEET GLASS
Filed Jan. 11, 1936   3 Sheets-Sheet 1

INVENTORS
WALTER G. KOUPAL AND
HARRY F. HITNER
BY Bradley & Bee
ATTORNEYS.

April 19, 1938.     W. G. KOUPAL ET AL     2,114,715
APPARATUS FOR MAKING SHEET GLASS
Filed Jan. 11, 1936     3 Sheets-Sheet 2

INVENTORS
WALTER G. KOUPAL and
HARRY F. HITNER
BY Bradley & Bee
ATTORNEYS.

April 19, 1938. W. G. KOUPAL ET AL 2,114,715
APPARATUS FOR MAKING SHEET GLASS
Filed Jan. 11, 1936     3 Sheets-Sheet 3

INVENTORS
WALTER G. KOUPAL and
HARRY F. HITNER
BY Bradley + Bee
ATTORNEYS.

Patented Apr. 19, 1938

2,114,715

UNITED STATES PATENT OFFICE 2,114,715

APPARATUS FOR MAKING SHEET GLASS

Walter G. Koupal, Tarentum, and Harry F. Hitner, Oakmont, Pa., assignors to Pittsburgh Plate Glass Company, a corporation of Pennsylvania Application January 11, 1936, Serial No. 58,714

5 Claims. (Cl. 49—17)

The invention relates to apparatus for making sheet glass by a continuous process, wherein the sheet is drawn vertically from a molten bath. In an operation of this kind, the edges of the sheet lie relatively close to the side walls of the tank and great difficulty is experienced in maintaining the glass in the bath at the points from which the sheet edges are generated in condition for satisfactory drawing, over extended periods of time. It is necessary to lower the temperature of the glass for the edge gather to a point at which the viscosity will be high enough to maintain sheet width, but this condition is difficult to keep localized and the chilled portion extends to a width and depth beyond that immediately feeding into the edge with the result that this portion gets too cold and stiff. The edge portion of the sheet is imperfectly formed as to thickness and straightness and in addition vents occur in the bead. These defects cause much breakage in the machines, and even with no breakage, a narrower net sheet results before proper sheet strength or thickness is established from the edge in toward the sheet center. The excess chilled portion devitrifies along the side of the drawing kiln adjacent to the edge of the sheet and also on the ends of the draw bar. This development causes periodical shut downs for reheating and considerable production is lost. Were it not for heating up the edges, the kiln cycles would be practically indefinite as regards the condition of the kiln itself.

Figure 2:
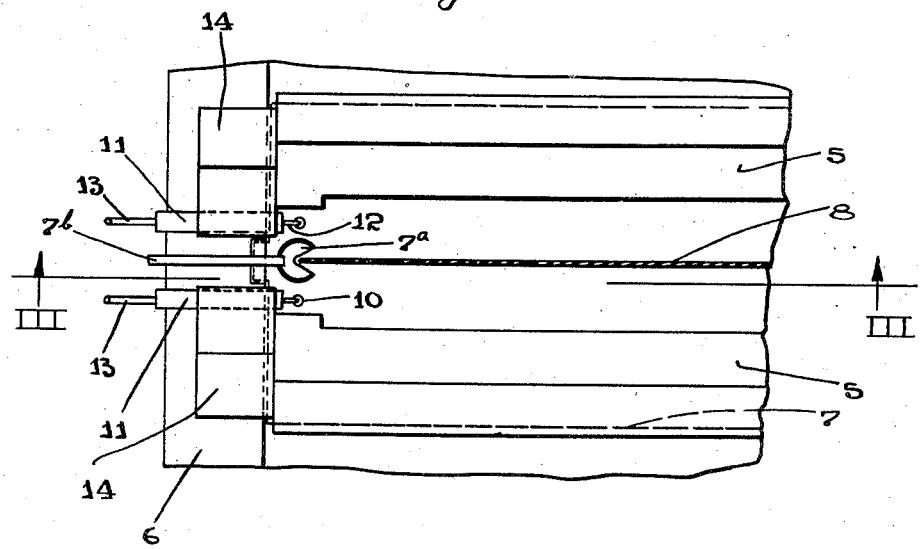
Figure 3:
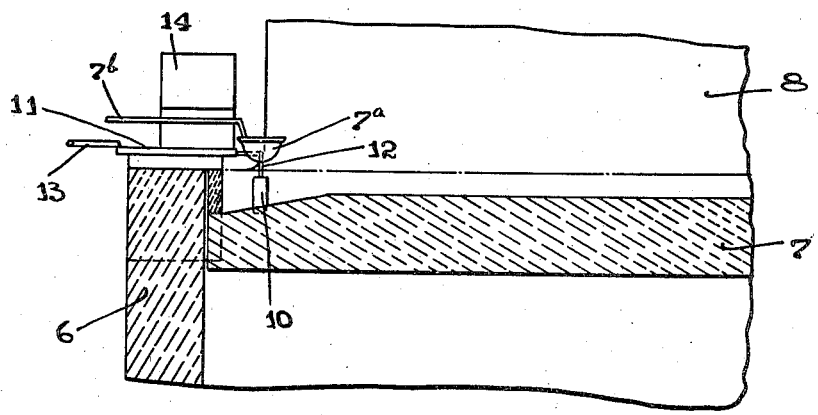
Figure 7:
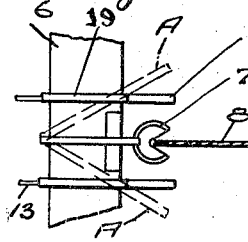
Figure 8:
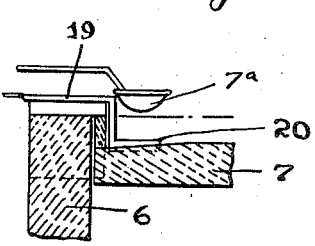
Figure 4:
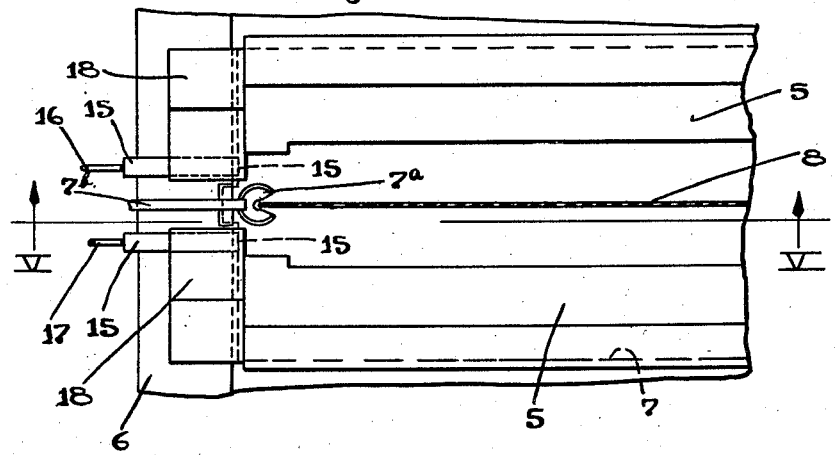
Figure 5:
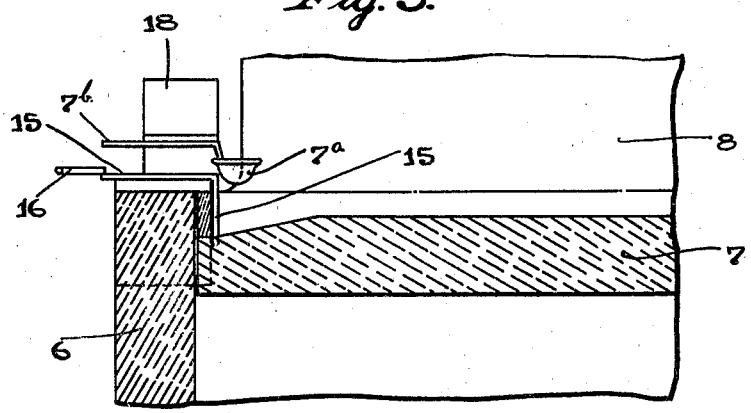
Figure 6:
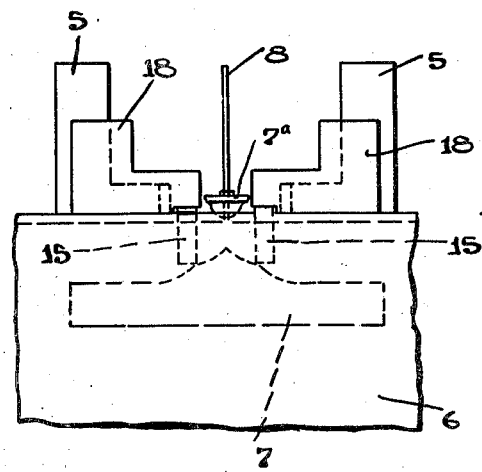

It is the object of the present invention to overcome the foregoing difficulties and provide means (subject to regulation to meet varying conditions), which will maintain the molten glass in the areas from which the edges of the sheet are drawn at the same temperature as long as the drawing operation is continued, thus giving edges which are uniform in thickness, straight, and free from vents, and which prevents devitrification and avoids the necessity of the accompanying periodic shut downs for reheating. Certain embodiments of the invention are illustrated in the accompanying drawings, wherein:

Figure 1 is a longitudinal section through a drawing kiln or tank equipped with the improvement. Fig. 2 is a partial plan view. Fig. 3 is a section on the line III—III of Fig. 2. Figs. 4, 5 and 6 illustrate a modification, Fig. 4 being a plan view, Fig. 5 a section on the line V—V of Fig. 4, and Fig. 6 an end view. And Figs. 7 and 8 illustrate a further modification, Fig. 7 being a plan, and Fig. 8 a vertical section.

Referring to the drawings, and particularly to Fig. 1, which shows the clay work, 1 is the drawing tank or kiln of substantial depth connected at its left hand end with a melting tank of the usual construction, 2 being the end wall of such melting tank. Lying above the kiln 1 is a cover or roof made up of the arch members 3 and 4 and the L blocks 5, 5, suitably supported by means which are not shown. Extending transversely of the tank between the side walls 6, 6 is a draw bar 7 whose center line defines the line of generation of the glass sheet 8 which is drawn continuously from the bath. As illustrated, the drawing is accomplished through a leer of the Fourcault type comprising a casing 9 provided on its interior with pairs of opposing driven rolls which grip the faces of the glass sheet, such drawing mechanism being well known in the art and requiring no further description or illustration.

Suitably supported from the side walls 6, 6 of the tank on brackets 7b are the edge bowls 7a, 7a of the type shown in the Slingluff Patent No. 1,549,513, dated August 11, 1925, such edge bowls being slotted so that the edges of the sheets pass therethrough and prevent the sheet from narrowing during the drawing operation. It will be understood in this connection that other forms of edge holding devices may be employed, such as the well-known edge rollers, and that any particular type of edge holder is immaterial in so far as the present improvement is concerned, but that some type of edge holder is necessary in order to assure the proper functioning of the drawing apparatus. Located at each side of the kiln is a pair of electrodes 10, 10, such electrodes as illustrated in Figs. 1, 2 and 3, consisting of short lengths of tubing sealed at each end and submerged in the glass. The composition of these electrodes is preferably ascoloy, which is a nickel chromium iron alloy, but any suitable alloy may be employed which will not discolor the glass under the temperature conditions encountered, various nickel chromium alloys being suitable for this purpose. The electrodes are preferably located about 4 inches out from the side wall of the tank and are about 14 inches apart, although these dimensions are subject to variations depending upon conditions. Each electrode is supported from a plate 11 lying upon the tank wall, connection being made between the plates and electrodes by means of the rods 12, the rods being secured to the plates and electrodes by welding. The electrode, rod and plate may be all of the same composition or may be made of different compositions. The plates 11, 11 have attached to their ends the leads 13, 13 connected to a suitable source of current supply.

In order to hold the plates 11, 11 securely in position upon the wall of the tank, blocks 14, 14 of refractory material, such as clay, are placed thereon and by their weight perform the desired function, the blocks 14, 14 also serving to fit up against the ends of the L blocks and close the cracks or spaces between the ends of the L blocks and the side walls of the furnace, thus reducing the infiltration of air at these points.

In the operation of the apparatus, there is a tendency for the glass beneath the edge bowl, from which the edge of the sheet is generated, to gradually cool down and become too viscous, as heretofore pointed out, which results in imperfections in such edges and breakage. It also results in devitrification along the side edges of the drawing kiln and from time to time periodic shut downs for reheating are required. The use of the electrodes 10, 10 with the flow of current therebetween through the glass largely overcomes this difficulty, as this flow of current heats the glass to any desired extent, this being subject to regulation so as to secure exactly the right degree of heating, as too much heating would render the glass unduly fluid. It is thus possible to maintain a very uniform condition at the point at which the sheet edge is generated, which results in a more perfect edge and one which is not subject to breakage due to vents and the like. The heating of the glass at this point also prevents devitrification, so that the drawing operation may be continued for indefinite periods without shutting down to recondition the glass next to the side walls of the tank.

It will be understood that the shape and the location of the electrodes may be modified to a large extent without departing from the invention, and Figs. 4, 5 and 6 illustrate a modification involving a very considerable departure, but one which has been found to operate successfully. The general arrangement of the tank parts is the same as in the construction heretofore described, the departure in the modification relating to the shape and location of the electrodes. In this case, the electrodes comprise the pair of flat plates 15, 15 of nickel chromium or other suitable alloy having their upper portions bent at right angles to their vertical portions so that they lie upon the top wall of the tank, such top portions being connected to suitable leads 16, 17 for supplying current. Holding down blocks 18, 18 are employed in this construction and correspond in function to that of the blocks 14, 14 of the first construction. In this case, the electrodes 15, 15 lie against the face of the side wall 6 instead of being spaced away therefrom as in the first type of construction.

In the modification of Figs. 7 and 8, the electrodes 20 are of angular shape and are provided with shanks 19 lying above the wall 6. With this form of electrode, the principal current flow is between the portions most remote from the wall 6 where the glass is hotter than it is next to the wall and of lower resistance, but at the same time there is sufficient heating effect next to the wall to keep the glass fluid and prevent devitrification. By tilting the electrodes as indicated at A in dotted lines, the current flow between the outer portions of the electrodes may be adjusted to meet varying conditions.

What we claim is:

1. In combination with a drawing kiln adapted to carry a body of molten glass and means for drawing a glass sheet continuously therefrom with its edges adjacent the side walls of the kiln, means for applying heat to those portions only of the bath from which edges of the sheet are drawn comprising a pair of electrodes in the glass at each side of the kiln, the members of each pair being spaced apart with one member of each pair in front of the area from which the edge is drawn and the other to the rear thereof, and means for causing a flow of electric current through the glass from one member of each pair of electrodes to the other member of the same pair.

2. In combination with a drawing kiln adapted to carry a body of molten glass and means for drawing a glass sheet continuously therefrom with its edges adjacent the side walls of the kiln, means for applying heat to those portions only of the bath from which edges of the sheet are drawn comprising a pair of electrodes in the glass at each side of the kiln, the members of each pair being spaced apart with one member of each pair in front of the area from which the edge is drawn and the other to the rear thereof, and means for causing a flow of electric current through the glass from one member of each pair of electrodes to the other member of the same pair, said electrodes comprising vertical members spaced inward from the walls of the kiln.

3. In combination with a drawing kiln adapted to carry a body of molten glass and means for drawing a glass sheet continuously therefrom with its edges adjacent the side walls of the kiln, means for applying heat to those portions only of the bath from which edges of the sheet are drawn comprising a pair of electrodes in the glass at each side of the kiln, the members of each pair being spaced apart with one member of each pair in front of the area from which the edge is drawn and the other to the rear thereof, and means for causing a flow of electric current through the glass from one member of each pair of electrodes to the other member of the same pair, said electrodes comprising vertical plates lying against the wall of the tank.

4. In combination with a drawing kiln adapted to carry a body of molten glass, means for drawing a glass sheet from said body with the sheet extending transversely of the kiln with its edges adjacent the side walls thereof, and edge holding means for the sheet at each side of the kiln above the surface of the molten body, means for applying heat to those portions only of the bath from which edges of the sheet are drawn comprising a pair of electrodes in the glass at each side of the kiln, the members of each pair being spaced apart with one member of each pair in front of the area from which the edge is drawn and the other to the rear thereof, and means for causing a flow of electric current through the glass from one member of each pair of electrodes to the other member of the same pair.

5. In combination with a drawing kiln adapted to carry a body of molten glass and means for drawing a glass sheet continuously therefrom with its edges adjacent the side walls of the kiln, means for applying heat to those portions only of the bath from which edges of the sheet are drawn comprising a pair of electrodes in the glass at each side of the kiln, the members of each pair being spaced apart with one member of each pair in front of the area from which the edge is drawn and the other to the rear thereof, and means for causing a flow of electric current through the glass from one member of each pair of electrodes to the other member of the same pair, said electrodes being in the form of angles having their vertical legs next to the tank wall and their horizontal lips extending away from the wall below the surface of the glass.

WALTER G. KOUPAL.
HARRY F. HITNER.